United States Patent
Lin et al.

(10) Patent No.: US 6,961,098 B2
(45) Date of Patent: Nov. 1, 2005

(54) TV ENCODER WITH A FUNCTION OF ADJUSTING HUE

(75) Inventors: Chien-hung Lin, Hsinchu (TW); I-ping Hsu, Hsinchu (TW)

(73) Assignee: Faraday Technology Corp., Hsin-Chu (TW)

(*) Notice: Subject to any disclaimer, the term of this patent is extended or adjusted under 35 U.S.C. 154(b) by 527 days.

(21) Appl. No.: 10/180,390

(22) Filed: Jun. 25, 2002

(65) Prior Publication Data

US 2003/0234893 A1 Dec. 25, 2003

(51) Int. Cl.[7] .................................................. H04N 9/64
(52) U.S. Cl. ...................................... 348/649; 348/642
(58) Field of Search ................................ 348/649, 650, 348/651, 653, 654, 638, 639, 640, 641, 662, 727; 382/162, 167

(56) References Cited

U.S. PATENT DOCUMENTS 5,161,005 A * 11/1992 Harradine ................... 348/649
6,124,899 A * 9/2000 Swan et al. ................. 348/642
6,674,487 B1 * 1/2004 Smith ......................... 348/649

\* cited by examiner

Primary Examiner—Victor R. Kostak
(74) Attorney, Agent, or Firm—Winston Hsu

(57) ABSTRACT

A TV encoder with a function of adjusting hue for receiving a first and second color mixture signals comprises a first and second multiplexors, a sin-cos generator, a first and second multiplier circuits, and an adder circuits. The first multiplexor alternately outputs the second color mixture signal and its inverted signal. The second multiplexor alternately outputs a first angle signal representative of an angle and a second angle signal representative of the negative value of the angle. The angle is adopted to change the hue. The sin-cos generator outputs a sin and cos signals with a phase angle alternately determined by the angle and its negative value. The first color mixture signal and the sin signal are multiplied through the first multiplier circuit so as to be output as a first product signal. The second color mixture signal and its inverted signal are alternately multiplied by the cos signal through the second multiplier circuit so as to output as a second product signal. Finally, the first and second product signals are added through the adder circuit.

4 Claims, 3 Drawing Sheets

TV ENCODER WITH A FUNCTION OF ADJUSTING HUE

BACKGROUND OF THE INVENTION

1. Field of the Invention

The invention relates to a TV encoder and, more particularly, to a TV encoder with a function of adjusting hue.

2. Description of the Related Art

A conventional video signal generator device, such as a DVD player, includes a hue processor and a TV encoder, both of which are coupled together through a linear transformation circuit. The linear transformation circuit performs arithmetic operations of linear transformation on a set of hue components of the video signal output from the hue processor such that another set of hue components is input into the TV encoder for encoding.

FIG. 1 is a circuit block diagram showing a portion of a conventional video signal generator device 1. Referring to FIG. 1, the conventional video signal generator device 1 includes a hue processor 10, a linear transformation circuit 11, and a TV encoder 12. First, a set of color mixture signals Cb and Cr representative of hue components of a video signal are changed through the hue processor 10 into another set of color mixture signals Cb' and Cr' with adjusted hue. Subsequently, the color mixture signals Cb' and Cr' are subjected to arithmetic operations of linear transformation through the linear transformation circuit 11 and then transformed into still another set of color mixture signals U and V. Finally, the color mixture signals U and V are encoded in the TV encoder 12 so as to be output as color mixture signals Cp and Cn. The operations of the conventional hue processor 10, linear transformation circuit 11, and TV encoder 12 will be described in detail hereinafter with reference to FIGS. 2(a) to 2(c).

FIG. 2(a) is a detailed circuit diagram showing the hue processor 10 of the conventional video signal generator device 1 shown in FIG. 1. Referring to FIG. 2(a), in addition to a level-shifting signal Sv, the color mixture signals Cb and Cr are input into adder circuits 101 and 102, respectively. The adder circuit 101 outputs a difference Cb−Sv between the color mixture signal Cb and the level-shifting signal Sv while the adder circuit 102 outputs a difference Cr−Sv between the color mixture signal Cr and the level-shifting signal Sv. The level-shifting signal Sv is adopted to adjust the range of corresponding levels of the color mixture signals Cb and Cr. A sin-cos generator 103 outputs a sin signal sin(X) and a cos signal cos(X) of an adjusting angle X which is adopted to change the hue determined by the color mixture signals Cb and Cr. The signal Cb−Sv is multiplied by the cos signal cos(X) and sin signal sin(X) through multiplier circuits 104 and 105, respectively, so as to be output as signals (Cb−Sv)cos(X) and (Cb−Sv) sin(X). The signal Cr−Sv is multiplied by the cos signal cos(X) and sin signal sin(X) through multiplier circuits 106 and 107, respectively, so as to be output as signals (Cr−Sv)cos(X) and (Cr−Sv) sin(X). The signal (Cb−Sv)cos(X) is added with the signal (Cr−Sv) sin(X) through an adder circuit 108 and then is added with the level-shifting signal Sv through an adder circuit 109 so as to be output as a signal (Cb−Sv)cos(X)+(Cr−Sv) sin(X)+Sv, which is hereinafter referred to as a signal Cb'. On the other hand, the signal (Cr−Sv)cos(X) is subtracted from the signal (Cb−Sv) sin(X) through an adder circuit 110 and then is added with the level-shifting signal Sv through an adder circuit 111 so as to be output as a signal (Cr−Sv)cos(X)−(Cb−Sv) sin(X)+Sv, which is hereinafter referred to as a signal Cr'. To sum up, the operations shown in FIG. 2(a) can be represented as the following equation:

$$\begin{bmatrix} Cb' \\ Cr' \end{bmatrix} = \begin{bmatrix} \cos X & \sin X \\ -\sin X & \cos X \end{bmatrix} \begin{bmatrix} Cb - Sv \\ Cr - Sv \end{bmatrix} + \begin{bmatrix} Sv \\ Sv \end{bmatrix} \quad (1)$$

FIG. 2(b) is a detailed circuit diagram showing the linear transformation circuit 11 of the conventional video signal generator device 1 shown in FIG. 1. Referring to FIG. 2(b), the signal Cb' is subtracted from the level-shifting signal Sv through an adder circuit 112 and then is multiplied by a first linear transformation constant K1 through a multiplier circuit 113 so as to be output as a signal (Cb'−Sv)×K1, which is hereinafter referred to as a signal U. On the other hand, the signal Cr' is subtracted from the level-shifting signal Sv through an adder circuit 114 and then is multiplied by a second linear transformation constant K2 through a multiplier circuit 115 so as to be output as a signal (Cr'−Sv)×K2, which is hereinafter referred to as a signal V. To sum up, the operations shown in FIG. 2(b) can be represented as the following equation:

$$\begin{bmatrix} U \\ V \end{bmatrix} = \begin{bmatrix} K1 & 0 \\ 0 & K2 \end{bmatrix} \begin{bmatrix} Cb' - Sv \\ Cr' - Sv \end{bmatrix} \quad (2)$$

FIG. 2(c) is a detailed circuit diagram showing the TV encoder 12 of the conventional video signal generator device 1 shown in FIG. 1. Referring to FIG. 2(c), a multiplexor 116 alternately outputs the signal V and its inverted signal −V. A sin-cos generator 117 outputs a sin signal sin(ωt) and a cos signal cos(ωt) wherein ω is a carrier frequency and t is time. The signal U is multiplied by the sin signal sin(ωt) so as to be output as a signal U×sin(ωt). On the other hand, the signals V and −V are alternately multiplied by the cos signal cos(ωt) through a multiplier circuit 119 so as to be output alternately as signals V×cos(ωt) and −V×cos(ωt). Finally, through an adder circuit 120, the signal U×sin(ωt) is alternately added with the signals V×cos(ωt) and −V×cos(ωt) so as to be output alternately as signals U×sin(ωt)+V×cos(ωt) and U×sin(ωt)−V×cos(ωt), which are hereinafter referred to as signals Cp and Cn, respectively. To sum up, the operations shown in FIG. 2(c) can be represented as the following equation:

$$\begin{bmatrix} Cp \\ Cn \end{bmatrix} = \begin{bmatrix} \sin(\omega t) & \cos(\omega t) \\ \sin(\omega t) & -\cos(\omega t) \end{bmatrix} \begin{bmatrix} U \\ V \end{bmatrix} \quad (3)$$

SUMMARY OF THE INVENTION

Based on the advanced development of the manufacturing technology and circuit design of integrated circuits, the present invention proposes integrally combining the hue processor and TV encoder in the prior art into a single device, thereby reducing the amount of circuit components repeatedly used. Therefore, an object of the present invention is to provide a TV encoder with a function of adjusting hue in which the reduction of circuit components repeatedly used results in a lower cost of manufacturing.

According to one aspect of the present invention, a TV encoder with a function of adjusting hue, for receiving a first and second color mixture signals and having the function of changing the hue determined by the first and second color mixture signals, includes a first and second multiplexors, a sin-cos generator, a first and second multiplier, and an adder.

The multiplexor alternately outputs the second color mixture signal and its inverted signal. The second multiplexor alternately outputs a first angle signal representative of an angle which is adapted to change the hue determined by the first and second color mixture signals and a second angle signal representative of the negative value of the angle. In response to the first and second angle signals, the sin-cos generator outputs a sin and cos signals with a carrier frequency. Each of the sin and cos signals has a phase angle which is alternately determined by the angle and the negative value of the angle.

The first color mixture signal and the sin signal are multiplied through the first multiplier circuit so as to be output as a first product signal. The second color mixture signal and its inverted signal are alternately multiplied by the cos signal through the second multiplier circuit so as to be output as a second product signal.

Finally, the first and second product signals are added through the adder circuit so as to be output as a sum signal.

According to another aspect of the invention, a video signal generator device includes a linear transformation circuit and a TV encoder with a function of adjusting hue. First, a set of color mixture signals Cb and Cr representative of hue components of a video signal are subjected to arithmetic operations of linear transformation through the linear transformation circuit and transformed into another set of color mixture signals U' and V'. Subsequently, the color mixture signals U' and V' are adjusted with respect to hue and then encoded through the TV encoder with a function of adjusting hue so as to be output as color mixture signals Cp and Cn.

BRIEF DESCRIPTION OF THE DRAWINGS

The above-mentioned and other objects, features, and advantages of the present invention will become apparent with reference to the following descriptions and accompanying drawings, wherein:

FIG. 2(*b*) is a detailed circuit diagram showing a linear transformation circuit of the conventional video signal generator device shown in FIG. 1;

FIG. 2(*c*) is a detailed circuit diagram showing a TV encoder of the conventional video signal generator device shown in FIG. 1;

FIG. 4(*b*) is a detailed circuit diagram showing a TV encoder of the video signal generator device, according to the present invention, shown in FIG. 3.

DETAILED DESCRIPTION OF THE PREFERRED EMBODIMENTS

Through arithmetic operations of linear algebra, the Equations (1), (2), and (3) can be inductively combined into a signal equation as follows:

$$\begin{bmatrix} Cp \\ Cn \end{bmatrix} = \begin{bmatrix} \sin(\omega t) & \cos(\omega t) \\ \sin(\omega t) & -\cos(\omega t) \end{bmatrix} \begin{bmatrix} U \\ V \end{bmatrix} \quad (4)$$

$$= \begin{bmatrix} \sin(\omega t) & \cos(\omega t) \\ \sin(\omega t) & -\cos(\omega t) \end{bmatrix} \begin{bmatrix} K1 & 0 \\ 0 & K2 \end{bmatrix} \begin{bmatrix} Cb' - Sv \\ Cr' - Sv \end{bmatrix}$$

$$= \begin{bmatrix} \sin(\omega t) & \cos(\omega t) \\ \sin(\omega t) & -\cos(\omega t) \end{bmatrix} \begin{bmatrix} K1 & 0 \\ 0 & K2 \end{bmatrix} \begin{bmatrix} \cos X & \sin X \\ -\sin X & \cos X \end{bmatrix} \begin{bmatrix} Cb - Sv \\ Cr - Sv \end{bmatrix}$$

$$= \begin{bmatrix} \sin(\omega t) & \cos(\omega t) \\ \sin(\omega t) & -\cos(\omega t) \end{bmatrix} \begin{bmatrix} \cos X & \sin X \\ -\sin X & \cos X \end{bmatrix} \begin{bmatrix} K1 & 0 \\ 0 & K2 \end{bmatrix} \begin{bmatrix} Cb - Sv \\ Cr - Sv \end{bmatrix}$$

$$= \begin{bmatrix} \sin(\omega t - X) & \cos(\omega t - X) \\ \sin(\omega t + X) & -\cos(\omega t + X) \end{bmatrix} \begin{bmatrix} K1 & 0 \\ 0 & K2 \end{bmatrix} \begin{bmatrix} Cb - Sv \\ Cr - Sv \end{bmatrix}$$

Based on Equation (4), the present invention provides a TV encoder with a function of adjusting hue. The preferred embodiments according to the present invention will be described in detail with reference to the drawings.

Figure 1:
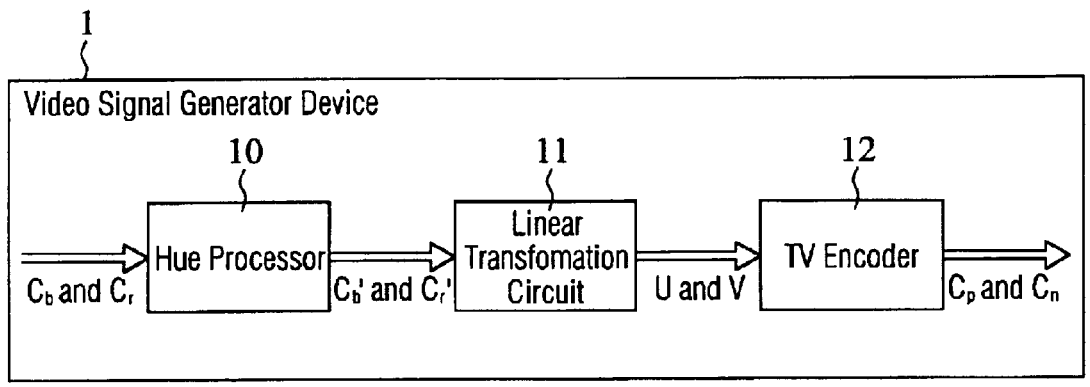
FIG. 1 is a circuit block diagram showing a portion of a conventional video signal generator device.
Figure 2A:
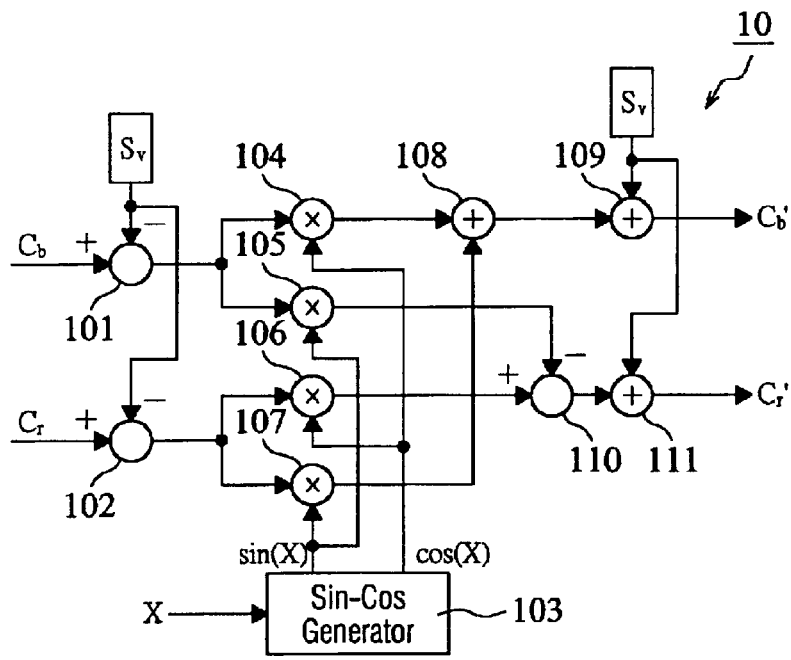
FIG. 2(*a*) is a detailed circuit diagram showing a hue processor of the conventional video signal generator device shown in FIG. 1.
Figure 2B:
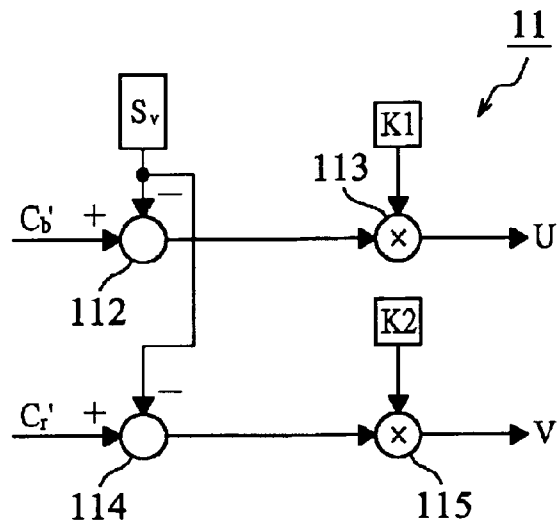
Figure 2C:
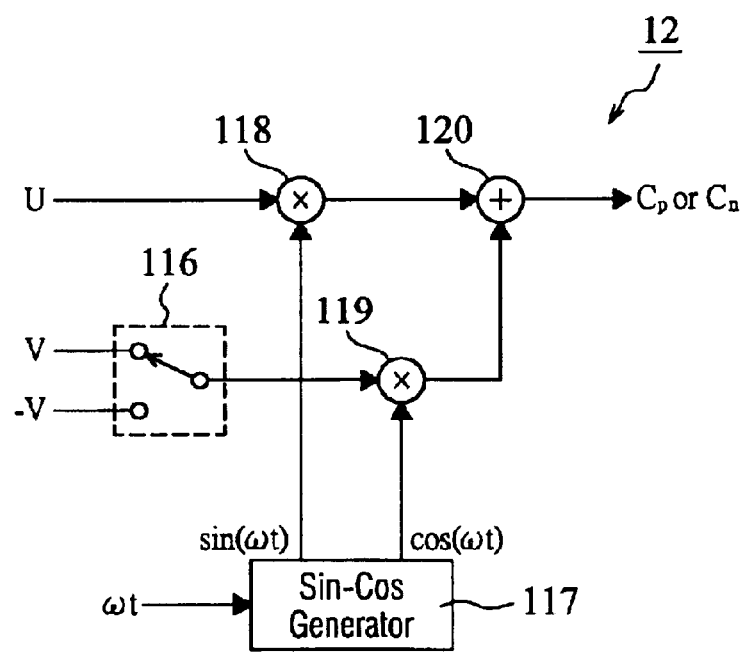
Figure 3:
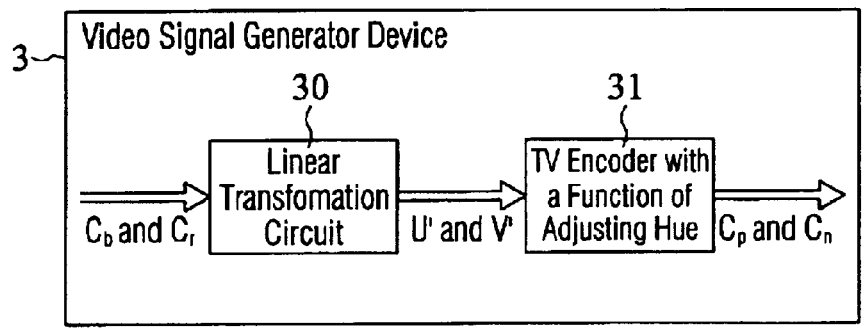
FIG. 3 is a circuit block diagram showing a portion of a video signal generator device according to the present invention.

FIG. 3 is a circuit block diagram showing a portion of a video signal generator device 3 according to the present invention. Referring to FIG. 3, the video signal generator device 3 according to the present invention includes a linear transformation circuit 30 and a TV encoder 31 with a function of adjusting hue. First, a set of color mixture signals Cb and Cr representative of hue components of a video signal are subjected to arithmetic operations of linear transformation through the linear transformation circuit 30 and transformed into another set of color mixture signals U' and V'. Subsequently, the color mixture signals U' and V' are adjusted with respect to hue and then encoded through the TV encoder 31 with a function of adjusting hue so as to be output as color mixture signals Cp and Cn. The operations of the linear transformation 30 and the TV encoder 31 with a function of adjusting hue will be described in detail hereinafter with reference to FIGS. 4(*a*) to 4(*b*).

Figure 4A:
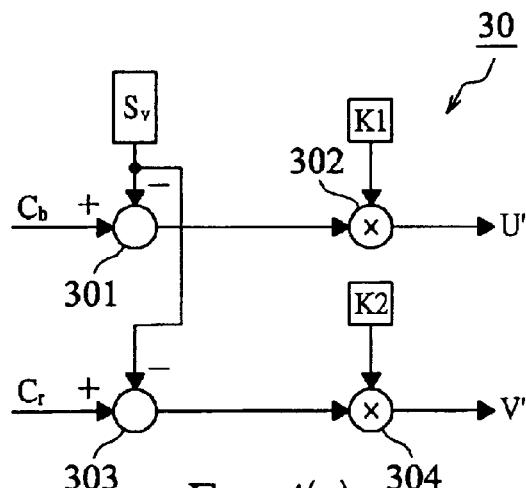
FIG. 4(*a*) is a detailed circuit diagram showing a linear transformation circuit of the video signal generator device, according to the present invention, shown in FIG. 3.

FIG. 4(*a*) is a detailed circuit diagram showing the linear transformation circuit 30 of the video signal generator device 3, according to the present invention, shown in FIG. 3. Referring to FIG. 4(*a*), the signal Cb is subtracted from the level-shifting signal Sv through an adder circuit 301 and then is multiplied by a first linear transformation constant K1 through a multiplier circuit 302 so as to be output as a signal (Cb−Sv)×K1, which is hereinafter referred to as a signal U'. The level-shifting signal Sv is adopted to adjust the range of corresponding levels of the color mixture signals Cb and Cr. On the other hand, the signal Cr is subtracted from the level-shifting signal Sv through an adder circuit 303 and then is multiplied by a second linear transformation constant K2 through a multiplier circuit 304 so as to be output as a signal (Cr−Sv)×K2, which is hereinafter referred to as a signal V'. To sum up, the operations shown in FIG. 4(a) can be represented as the following equation:

$$\begin{bmatrix} U' \\ V' \end{bmatrix} = \begin{bmatrix} K1 & 0 \\ 0 & K2 \end{bmatrix} \begin{bmatrix} Cb - Sv \\ Cr - Sv \end{bmatrix} \quad (5)$$

Figure 4B:
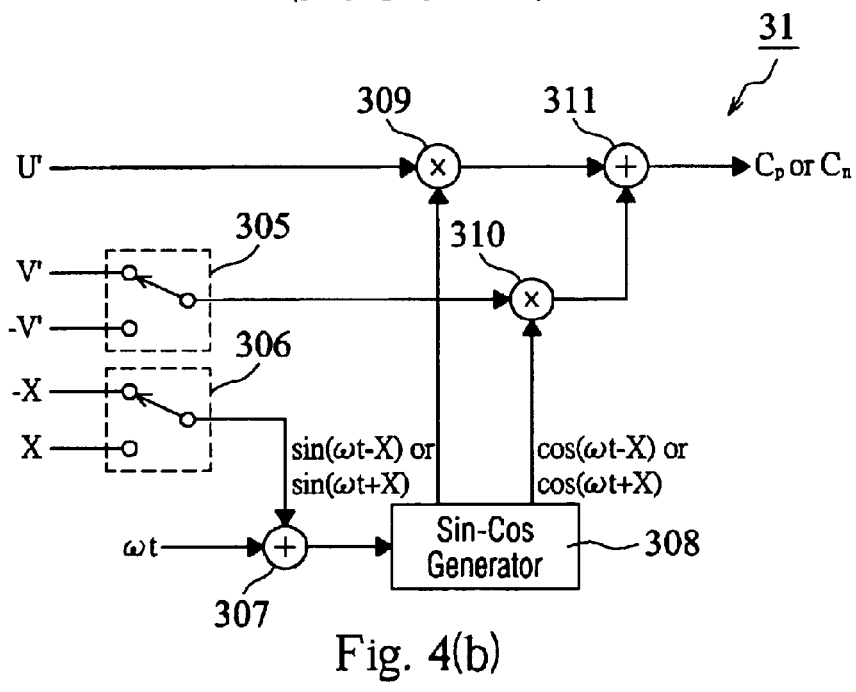

FIG. 4(b) is a detailed circuit diagram showing the TV encoder 31 of the video signal generator device 3, according to the present invention, shown in FIG. 3. Referring to FIG. 4(b), a first multiplexor 305 alternately outputs the signal V' and its inverted signal −V' while a second multiplexor 306 alternately outputs an adjusting angle X and its negative value −X. The adjusting angle X is adopted to change the hue determined by the color mixture signals U' and V'. In response to a signal generated from an adder circuit 307, a sin-cos generator 308 outputs both sin and cos signals with a carrier frequency ω and a phase angle which is alternately determined by the adjusting angle X and its negative value −X. More specifically, the sin-cos generator 308 alternately outputs sin signals sin(ωt+X) and sin(ωt −X), with respect to the sin signal generating function, and alternately outputs cos signals cos(ωt+X) and cos(ωt−X), with respect to the cos signal generating function. Here t is referred to as time. The signal U' is multiplied alternately by the sin signals sin(ωt+X) and sin(ωt−X) through a multiplier circuit 309 so as to be output alternately as signals U'×sin(ωt+X) and U'×sin(ωt−X). On the other hand, the signal V' and its inverted signal −V' are multiplied alternately by the cos signals cos(ωt−X) and cos(ωt+X), respectively, through a multiplier circuit 310 so as to be output alternately as signals V'×cos(ωt−X) and −V'×cos(ωt+X). Finally, through an adder circuit 311, the signals U'×sin(ωt−X) and U'×sin(ωt+X) are alternately added with the signals V'×cos(ωt−X) and −V'×cos(ωt+X) so as to be output alternately as signals U'×sin(ωt−X)+V'×cos(ωt−X) and U'×sin(ωt+X)−V'×cos(ωt+X), i.e. the signals Cp and Cn. To sum up, the operations shown in FIG. 4(b) can be represented as the following equation:

$$\begin{bmatrix} Cp \\ Cn \end{bmatrix} = \begin{bmatrix} \sin(\omega t - X) & \cos(\omega t - X) \\ \sin(\omega t + X) & -\cos(\omega t + X) \end{bmatrix} \begin{bmatrix} U' \\ V' \end{bmatrix} \quad (6)$$

Through arithmetic operations of linear algebra, the Equations (5) and (6) can be combined into the Equation (4). Therefore, a TV encoder with a function of adjusting hue is successfully achieved according to the present invention. In addition, the present invention also successfully provides a video signal generator device employing such a TV encoder with a function of adjusting hue.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A TV encoder with a function of adjusting hue, for receiving a first and second color mixture signals and having the function of changing the hue determined by the first and second color mixture signals, comprising:

a first multiplexor for alternately outputting the second color mixture signal and its inverted signal;

a second multiplexor for alternately outputting a first and second angle signals in which the first angle signal is representative of an angle which is adopted to change the hue determined by the first and second color mixture signals and the second angle signal is representative of the negative value of the angle;

a sin-cos generator for outputting a sin and cos signals with a carrier frequency in response to the first and second angle signals, each of the sin and cos signals having a phase angle which is alternately determined by the angle and the negative value of the angle;

a first multiplier circuit for receiving the first color mixture signal and the sin signal and outputting a first product signal representative of their product;

a second multiplier circuit for receiving the second color mixture signal and its inverted signal alternately output from the second multiplier circuit and the cos signal and outputting a second product signal alternately representative of the product of the second color mixture signal and the cos signal and the product of the inverted signal of the second color mixture signal and cos signal; and a first adder circuit for receiving the first and second product signals and outputting a first sum signal representative of their sum.

2. The TV encoder according to claim 1, wherein the first and second color mixture signals are generated through a linear transformation circuit by performing arithmetic operations of linear transformation on a third and fourth color mixture signals, respectively.

3. The TV encoder according to claim 2, wherein the linear transformation circuit comprises:

a second adder circuit for receiving the third color mixture signal and a level-shifting signal and outputting a second sum signal representative of their difference;

a third adder circuit for receiving the fourth color mixture signal and the level-shifting signal and outputting a third sum signal representative of their difference;

a third multiplier circuit for receiving the second sum signal and a first linear transformation constant and outputting a signal representative of their product as the first color mixture signal; and a fourth multiplier circuit for receiving the third sum signal and a second linear transformation constant and outputting a signal representative of their product as the second color mixture signal.

4. A video signal generator device, comprising:

a TV encoder with a function of adjusting hue, for receiving a first and second color mixture signals and having the function of changing the hue determined by the first and second color mixture signals, comprising:

a first multiplexor for alternately outputting the second color mixture signal and its inverted signal;

a second multiplexor for alternately outputting a first and second angle signals in which the first angle signal is representative of an angle which is adopted to change the hue determined by the first and second color mixture signals and the second angle signal is representative of the negative value of the angle;

a sin-cos generator for outputting a sin and cos signals with a carrier frequency in response to the first and second angle signals, each of the sin and cos signals having a phase angle which is alternately determined by the angle and the negative value of the angle;

a first multiplier circuit for receiving the first color mixture signal and the sin signal and outputting a first product signal representative of their product;

a second multiplier circuit for receiving the second color mixture signal and its inverted signal alternately output from the second multiplier circuit and the cos signal and outputting a second product signal alternately representative of the product of the second color mixture signal and the cos signal and the product of the inverted signal of the second color mixture signal and cos signal; and a first adder circuit for receiving the first and second product signals and outputting a first sum signal representative of their sum, and a linear transformation circuit comprising:

a second adder circuit for receiving the third color mixture signal and a level-shifting signal and outputting a second sum signal representative of their difference;

a third adder circuit for receiving the fourth color mixture signal and the level-shifting signal and outputting a third sum signal representative of their difference;

a third multiplier circuit for receiving the second sum signal and a first linear transformation constant and outputting a signal representative of their product as the first color mixture signal; and a fourth multiplier circuit for receiving the third sum signal and a second linear transformation constant and outputting a signal representative of their product as the second color mixture signal.

\* \* \* \* \*